Figure 1:

J. T. H. DEMPSTER.
ELECTRODE.
APPLICATION FILED MAY 20, 1904.

1,118,399.

Patented Nov. 24, 1914.

Witnesses:
George H. Tilden
Helen Oxford

Inventor:
John T. H. Dempster,
by Albert G. Davis
Att'y.

UNITED STATES PATENT OFFICE.

JOHN T. H. DEMPSTER, OF SCHENECTADY, NEW YORK, ASSIGNOR TO GENERAL ELECTRIC COMPANY, A CORPORATION OF NEW YORK.

ELECTRODE.

1,118,399.          Specification of Letters Patent.          Patented Nov. 24, 1914.

Application filed May 20, 1904. Serial No. 209,807.

*To all whom it may concern:*

Be it known that I, JOHN T. H. DEMPSTER, a citizen of the United States, residing at Schenectady, county of Schenectady, State of New York, have invented certain new and useful Improvements in Electrodes, of which the following is a specification.

My present invention relates to electrodes for arc lamps, more particularly to electrodes giving flaming or luminous arcs.

Electrodes composed principally or largely of a mixture of iron in the form of one or more of its oxids, such for instance as magnetite, with titanium in the form of its normal oxid ($TiO_2$) as described in my Patent 1,010,402, of Nov. 28, 1911, possess many excellent properties. I have found, however, that these electrodes and other electrodes of a similar nature may be improved by the addition to their composition of a material or materials which will materially decrease their rate of consumption. In particular I have found that the addition of chromium oxid ($Cr_2O_3$), either alone or mixed naturally or artificially with some other suitable material, has an excellent effect in increasing the life of the electrode without appreciably, if at all, diminishing the efficiency of the arc as a source of light, and in some cases, such addition, I find increases the efficiency of illumination. I have obtained excellent results with chromium oxid and iron oxid in the form of the natural mineral chromite and also with an artificial mixture of magnesia and chromium oxid.

The chromium oxid or the composition containing chromium oxid added to the electrodes to increase their life I call a "restrainer." The action of the restrainer is, I believe, to raise the melting point of the electrodes and to decrease the amount of material vaporized by the passage of a given current. This view is the more probable as the chromium oxid and the compositions referred to are highly refractory. Whatever the nature of the action may be, however, I find that the addition of a comparatively small amount, say in the neighborhood of fifteen parts of restrainer to an electrode composed of say seventy parts of magnetite, and thirty parts of rutile, will increase the life of the electrode frequently as much as one hundred per cent. or more without materially, if at all, decreasing the light-giving efficiency of the electrode. The increase of life obtained by the use of the restrainer depends more or less on the purity of the materials employed and on the proportions used.

The various features of novelty which characterize my invention are pointed out with particularity in the claims annexed to and forming a part of this specification. For a better understanding of my invention, however, reference may be made to the accompanying drawings and description in which I have illustrated and described an electrode embodying my present invention.

Figure 3:
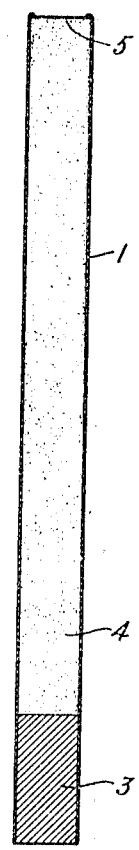
Figure 2:
Figure 4:

Of the drawings, Figure 1 is an elevation and Fig. 2 is a plan showing an electrode with a fused end; and Fig. 3 is a sectional elevation and Fig. 4 a plan showing an electrode with a disk retainer.

Referring to the drawings 1 represents a thin metallic tube preferably formed of iron. This tube may be formed of a strip of sheet metal bent upon itself and having its edges united by a lap seam as indicated at 2. A plug 3 which may be of wood fits snugly in the lower end of the electrode. Above the plug is inserted the filling 4. The filling 4 may consist of seventy parts of magnetic oxid of iron, thirty parts of rutile, and twelve and one-half parts of natural chromite. In this specimen of electrode composition the weight of the restrainer is less than one-ninth ($\frac{1}{9}$) of the total weight of the electrode. The filling is preferably ground to a fine powder and the various constituents are thoroughly mixed together after which it is very firmly packed in the tube 1 by hand or by automatic machinery as may seem desirable.

After the filling is inserted in the tube the upper end of the tube and filling may be initially fused together by an electric arc, in which case the end will appear as shown in Figs. 1 and 2. Instead of initially fusing the filling and tube together a disk-shaped piece 5 of the same stock from which the tube 1 is made may be inserted in the tube and the end of the tube may be crimped over to retain the disk in place as shown in Figs. 3 and 4. After the electrode shown in Figs. 3 and 4 has been run some time the arc will convert the end of the electrode shown in Figs. 3 and 4 into the form shown in Figs. 1 and 2.

The natural mineral chromite used as a restrainer gives very good results unless the aluminum oxid which usually occurs in it in variable quantities is present in too great amounts. Chromite also usually contains some magnesia and a small percentage of other materials.

Instead of chromite I have used for the restrainer a mixture containing one part of magnesia and four parts of commercial chromium oxid with excellent results, and I have also used commercial chromium oxid unmixed with other materials. Commercial chromium oxid, however, does not seem to give as good results as chromite containing but a small amount of aluminum oxid or a mixture of commercial chromium oxid and magnesia.

In the specific compositions of electrode which I have herein described the iron of the magnetite is the base or foundation which primarily furnishes and feeds the arc; the titanium contained in its oxid serves to intensify the luminosity of the arc furnished by the base and is, therefore, the intensifier of the electrode composition, and the chromium in its oxid or in the chromite serves to retard the consumption of the electrode and is, therefore, the base of the restrainer, of the electrode composition. Each element has thus a distinct function, and the greatest utility of my electrode is obtained from the simultaneous performance of these functions, although my invention, in its broader aspect, is not limited thereto.

While the electrodes formed of the materials above specified and in the proportions mentioned give very excellent results both as to luminosity and life, good electrodes can be made of other materials and in other proportions in which the use of a restrainer of the character specified is highly advantageous, and I do not intend that the claims hereinafter made shall be limited to the particular electrode described more than may be made necessary by the state of the art.

I do not herein claim that specific embodiment of my invention in which the mineral chromite is used as a restrainer, this specific embodiment of my invention being claimed in a divisional application, Serial No. 657,041 filed Oct. 27th, 1911.

What I claim as new and desire to secure by Letters Patent of the United States, is,—

1. An arc-light electrode consisting essentially of an arc maintaining body of ferric and titanic material, and a small amount of a restrainer having chromium as its base intimately mixed with said material, whereby the consumption of the electrode is retarded.

2. An arc-light electrode consisting of an arc maintaining body composed essentially of magnetite and titanium oxid, and a small amount of a restrainer containing chromium oxid intimately mixed with the arc maintaining body, whereby the consumption of the electrode is retarded.

3. An arc-light electrode consisting of an arc maintaining body essentially composed of a mixture of magnetite and titanic material, with an addition of a chromium compound in amount less than one-ninth of the total weight of the electrode, whereby the consumption of the electrode is retarded.

In witness whereof, I have hereunto set my hand this 18th day of May, 1904.

JOHN T. H. DEMPSTER.

Witnesses:
BENJAMIN B. HULL,
HELEN ORFORD.